Jan. 15, 1924.
S. J. POPLAWSKI
DRINK MIXER
Original Filed July 18, 1921
1,480,915
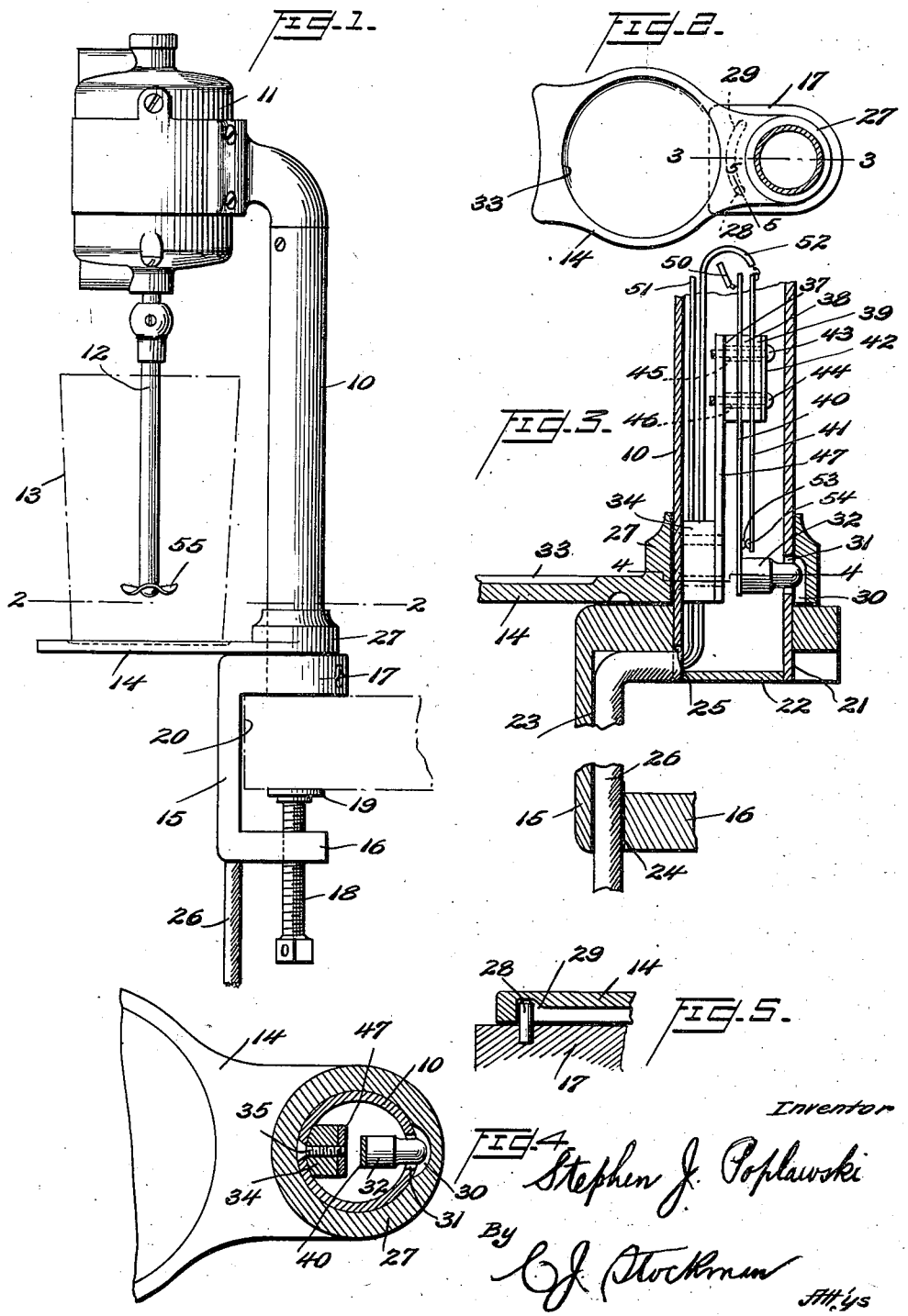

Patented Jan. 15, 1924.

1,480,915

UNITED STATES PATENT OFFICE.

STEPHEN J. POPLAWSKI, OF RACINE, WISCONSIN, ASSIGNOR TO ARNOLD ELECTRIC COMPANY, OF RACINE, WISCONSIN, A CORPORATION OF WISCONSIN.

DRINK MIXER.

Application filed July 18, 1921, Serial No. 485,440. Renewed June 15, 1923.

*To all whom it may concern:*

Be it known that I, STEPHEN J. POPLAWSKI, a citizen of the United States, residing at Racine, in the county of Racine and State of Wisconsin, have invented certain new and useful Improvements in Drink Mixers, of which the following is a specification.

This invention relates to drink mixers, and finds its particular adaptation in that type of drink mixers usually found at fountains for preparing beverages and incorporating an electrically driven agitating member or stirrer.

It has for its object the provision in a drink mixer of a glass support, which is freely movable into and out of glass supporting position and at the same time actuating the switch which controls the electrically driven motor for the stirrer. A further object is the provision in such a mixer of a glass support, which while freely movable, is not liable to accidental release, and one requiring a minimum of manipulation. A further object is the provision of a firm and secure mounting of the glass support, and the limitation of the movement of the glass support to that which is necessary for the placing and removing of a glass into and from mixing position.

A further object of the invention is the improvement of the construction of electrical switch, resulting in a quick response in starting and stopping the motor in the movements of the glass support.

A further object of the invention is the improvement of the stirrer element of a mixer of this type.

A further object of the invention is the provision of a bracket base for the motor column and the glass support, which will enable the device to be readily attached to counters or shelves, and in the provision in such a bracket base of means for leading in the electric wires in such manner that they will be hidden from view but will be conveniently disposed for connection with floor or wall sockets.

A further object of the invention is the provision of a drink mixer which will be economical in space occupied, and in the time and effort required to manipulate, simple in design and number of parts. And a still further object of the invention is the inclosing of the electrical parts within a single casing, and the mounting of the movable parts in such manner that any danger of shocks will be avoided.

Other objects and advantages of the invention will hereinafter appear in the following description and the novel features thereof will be particularly pointed out in the appended claims.

Like reference numerals indicate like parts throughout the several figures of the drawings, in which—

Figure 1 is a side elevation of the drink mixer of my invention,

Figure 2 is a plan view of the glass support viewed from the line 2—2 of Figure 1, Figure 3 is a sectional view of the lower portion of the motor column showing the switch mounted therein and the means for controlling the same by the movement of the glass support, Figure 4 is a section on the line 4—4 of Figure 3, and Figure 5 is a detail showing the means employed for limiting the movement of the glass support upon its mounting.

The numeral 10 designates the motor supporting column of a drink mixer, 11 the usual electric motor and 12 the rotating stirrer. 13 has been selected to indicate a glass or container for liquid to be mixed while 14 is the pivoted or oscillating support for such glass or container. 15 denotes the bracket base whereby the mixer may be attached to a counter or shelf.

The base of the mixer is in the form of a bracket comprising the U-shaped clamp having the legs 16 and 17. In the leg 16 there is provided a threaded aperture for the reception of a clamping screw 18, between the head 19 of which and the leg 17 the counter or shelf 20 is clamped.

As shown most clearly in Figure 3 the leg 17 is provided with an opening into which is snugly fitted the lower end of the motor column, which as shown is tubular in form and closed by a plug 22. Upon the inner face of the bracket base there is formed a groove 23 which extends across the leg 17 and the upright section, and in alignment with said groove there is formed an aperture 24 in the leg 16 and an aperture 25 in the lower end of the motor column, the groove and apertures being of sufficient dimensions to snugly receive a conductor 26 containing a pair of electric wires, whereby the mixer may be electrically connected with a source of electric current, as through a wall or floor socket. As shown in Figure 1 the conductor when in place is flush with the inner face of the bracket base and hidden from view.

The leg 17 forms a ledge or shelf for the glass support, which comprises a hub section 27 encircling the motor column and forming a broad bearing for the glass support, avoiding liability to tilt and jar the mixer in the movement of the glass support. It will be readily understood that the glass support is pivotally mounted upon the motor column in such a manner that it may be brought directly beneath the stirrer in order to support a glass in position to have the contents thereof mixed, or the support may be moved to one side or the other that the glass may be removed from the mixer.

In order that there may be limiting of the movement of the glass support, at a convenient point upon the outer face of the leg 17 there is mounted a stud or projection 28 and in the under face of the glass support there is formed a groove having the form of an arc of a circle and designated by the numeral 29, as best seen in Figures 2 and 5. It will be obvious that this groove is of such length as will permit the necessary movement of the glass support to one side of its central position to enable the glass to be removed from the mixer. When the glass support is in position for mixing a drink, the stud 28 rests in a depression in the bottom of the groove 29, and the glass support firmly rests upon the upper surface of the leg 17. In moving the support from this central position to a glass discharging position, it is slightly lifted, due to the fact that the main portion of the groove 29 is not as deep as the height of the stud 28. It will therefore readily appear that the depression in the groove acting with the stud constitutes a central locking device for the mixer, and that the movement of the glass support is accomplished without frictional contact of the under face of the support with the upper face of the leg of the mixer base.

As best shown in Figure 3 there is provided upon the inner face of the hub of the glass support a vertically disposed groove 30 and in the lower end of the motor column, registering with said groove, is an aperture 31. Projecting normally through this aperture and into the groove 30 when the glass support is in operative or mixing position is a button 32 controlling the electric switch of the mixer. Upon a movement of the glass support from its central or mixing position, the button 32 will be pushed inward by the vertical edges of the groove 30 and in this new position the electric current will be cut off. It will be appreciated that the button 32 acting in connection with the groove 30 constitutes an additional means for determining the central or mixing position of the glass support, and for maintaining the glass support in that position against accidental movement.

Proceeding now to a detailed description of the switch, the numeral 34 designates a spacing block secured within the motor column and 36 an upright switch supporting plate, these two elements being rigidly attached to the motor column by means of the screws 35, 35. At the upper end of the plate 36 is mounted the switch base, which comprises a series of spacing members 37, 38 and 39, of insulating material, a pair of spring switch elements 40 and 41, and a face plate 42. The switch element 40 is placed between the spacing members 37 and 38 and the switch element 41 is placed between the spacing members 38 and 39, while the plate 42 lies against the spacing member 39. Suitable apertures are provided in the several spacing members, in the switch elements and the face plate as well as screw threaded apertures in the switch supporting plate 36, for the reception of retaining screws 43 and 44 and for insulating bushings 45 and 46 surrounding said screws and shown in dotted lines in Figure 3. It is usual to make the supporting plate 46 of stiff sheet material, preferably metal, in which case it is faced with an insulating sheet 47.

Projecting above the switch base and preferably out of alignment with each other, are extensions 48 and 49 of the switch elements 40 and 41, respectively, to which are attached the ends of electric wires leading, respectively, to the motor and to a source of electric current. 50 designates the wire leading to the motor from the switch, 51 the wire leading from the motor to a source of electricity, and 52 the wire leading from the switch to the source of electricity.

At the lower end of the spring switch elements are points 53 and 54, which are in contact at the time the glass support is disposed beneath the stirrer of the mixer, as shown in Figure 3. The switch element 40 is extended beyond these points and to it is attached the button 32 of insulating material.

The stirrer rod 12 is of usual construction, and supports at its lower end a stirring element 55, which is made of a disk of sheet material having a sinusoidal periphery as shown in Figure 1. This form of stirring element has been found to be as effective as other forms which were considerably heavier, and it becomes of importance to have a light stirring element should the shaft get out of balance; a heavy element in that case causes increased vibration, rattle and wear upon the parts.

In the upper face of the glass support there is formed a depression or cavity 33 to receive the glass, and prevent accidental slipping of the glass from the support.

In mounting the mixer for use the clamp 15 is placed upon the edge of a counter or shelf and the screw 18 tightened to grip the counter firmly. The conduit 26 is then connected with a floor or wall socket as will be readily understood. In this position of the parts there are no portions of the electrical equipment bare through which shocks may be secured by the attendant. The conduit entering the lower end of the clamp 15 is from that point hidden from view and does not interfere with the mounting of the clamp upon the counter.

The glass support through its pivotal mounting upon the motor column and its contact with the upper face of the leg 17 of the counter clamp, is simply and firmly supported to permit of its oscillation to one side in inserting a glass under the stirrer, and to permit its easy return to glass supporting position. The limiting stop comprised in the stud 28 and groove 29 prevents undue movement of the glass support, while the depression in the bottom of the groove and the proportion of parts results in a slight locking of the glass support in its mixing position and a frictionless movement of the glass support to a glass releasing position. These features of construction permit the user of the drink mixer to insert a glass under the stirrer and a return of the support by means of a simple and easy manipulation of the fingers of one hand, and likewise the glass may be lifted and the support pushed to one side through the use of the fingers of one hand. It will be understood that the button 32 in the groove 30 does not constitute a positive lock or latch but only a temporary holding for the glass support in its central position, such holding as will be readily released by a slight pressure of a finger.

In its movements the glass support accomplishes the switching on and off of the electric current, as will be readily understood from a detailed description of the parts. The switch element 40 is of sufficient strength to establish firm electric contact between the points 53 and 54 and is of such strength as to press the button into the groove 30. It will be understood that the glass support may be moved vertically upon the motor column if occasion requires.

Having described my invention, what I claim as new and desire to secure by Letters Patent is:

1. In a drink mixer, the combination with a motor-driven, vertically-disposed stirrer, of a container support in vertical alignment with said stirrer and movable horizontally to a container-releasing position, and means actuated by the movement of the support to control the motor drive.

2. In a drink mixer, the combination with a motor-driven, vertically-disposed stirrer, of a container support in vertical alignment with said stirrer and mounted upon a vertical pivot for movement out of alignment with the stirrer to a container-releasing position, means for limiting the movement of said support, and means actuated by the movement of the support for controlling the motor-drive.

3. In a drink mixer, the combination with a vertical column, a motor supported at the upper end of said column having a depending vertically-disposed stirrer, a container support pivotally mounted upon the lower portion of said column in alignment with said stirrer and movable horizontally into a container-releasing position and means for supporting said support during its pivotal movement.

4. In a drink mixer, the combination with a vertical column, a motor supported at the upper end of said column and having a depending vertically-disposed stirrer, a container support pivotally mounted upon the lower portion of said column in alignment with said stirrer and movable horizontally to a container-releasing position, and means actuated by the movement of said support for controlling the motor.

5. In a drink mixer, the combination with a supporting column of circular cross section at its lower end, of a motor supported at the upper end of said column and having a depending stirrer, a container support pivoted upon the lower circular portion of said column to swing horizontally out of vertical alignment with the stirrer to container-releasing position, and means for controlling the motor from the movement of the container support.

6. In a drink mixer, the combination with a vertical column circular in cross section, of a motor supported at the upper end of said column and provided with a depending stirrer, of a container support comprising a bearing hub section mounted upon said circular column to permit of horizontally swinging said container support into and out of vertical alignment with the stirrer, and means actuated by the hub section in the movement of the container support to control the motor.

7. In a drink mixer, the combination with a vertical column circular in cross section, a motor supported at the upper end of said column and having a depending stirrer, an enlarged base supporting said column, and a container support comprising a bearing hub section mounted to pivot upon the lower end of said circular column and to be supported in its pivotal movement upon said enlarged base.

8. In a drink mixer, the combination with a vertical column circular in cross section, a motor supported at the upper end of said column and having a depending stirrer, a container support comprising a bearing hub section mounted to pivot in a longitudinal plane around the lower end of said circular column, and an electric switch within said column comprising a button projecting from the wall of said column, said hub section being provided with a vertical groove for the reception of said button, whereby the motor is controlled by the movements of the container support.

9. In a drink mixer, the combination with a vertical tubular column, a motor supported at the upper end of said column and having a depending stirrer, a container support comprising a bearing hub section pivotally mounted upon the tubular column at its lower end, and means for controlling the actuation of the motor in response to movements of the container support comprising a switch within the column, a button projecting from the column and controlling the movement of the switch, and a vertical groove in the hub bearing of the container support controlling the movement of the button.

10. In a drink mixer, the combination with a vertical tubular column, a motor supported at the upper end of said column and having a depending stirrer, a container support comprising a bearing hub section pivotally mounted upon the tubular column at its lower end, a switch within the tubular column for controlling the motor, a button projecting from the tubular column for controlling the actuation of said switch, and a vertical groove upon the bearing face of said hub section of the container support for permitting the projection of said button to actuate said switch, whereby the motor is automatically controlled by the movements of said container support to cause the motor to be operated only when the container support is in vertical alignment with the stirrer.

11. In a drink mixer, the combination with a motor carrying a vertically-disposed stirrer and a container support for positioning in alignment with the stirrer, of means for supporting said motor, stirrer and container support in operative relation including a vertical column upon which one of said elements may be swung horizontally to bring the container support and stirrer out of alignment, whereby the container may be removed from the mixer, and means actuated by the relative movement of the parts for controlling the motor.

12. In a drink mixer, the combination with a supporting column, of a motor having a depending stirrer and a container support mounted upon said column, and means to permit horizontal movement of one of said elements out of vertical alignment with the other into container-discharging position, said means comprising a pivotal connection between the column and the element.

13. In a drink mixer comprising a supporting column, a section of which is circular in cross section, a container support having a bearing portion mounted upon said circular section of said column to swing about the column as a pivot and means for supporting said support during its pivotal movement.

14. A drink mixer comprising a vertically-disposed stirrer, a mounting therefor comprising a base and a supporting column, and a container support mounted to swing about said column as a pivot and rest upon said base section in operative position.

15. A drink mixer comprising a vertically-disposed stirrer, a mounting therefor comprising a base section and a supporting column, and a container support mounted to swing about said column as a pivot and upon said base section, means for limiting the movement of said container support comprising a stud projecting from the face of said base and a groove in the under face of said container support.

16. A drink mixer comprising a vertically-disposed stirrer, a mounting therefor comprising a base section and a supporting column, and a container support mounted to swing about said column as a pivot and upon said base section, and means for controlling the movement of said container support upon said base section comprising a stud on one of said elements, and a groove upon the other of said elements of less depth than the height of said stud, said groove having a depression at a point therein, whereby the container support will rest firmly upon the base section in its operative position, but will be slightly lifted when moved to its container-discharging position.

17. A drink mixer comprising a column and a bracket support having the general form of a U and adapted to straddle the edge of a counter or shelf, and means for leading electric wires to the body of said mixer comprising a groove in the inner face of said bracket support and an opening in the lower end of the column.

18. A drink mixer comprising a tubular column and a U-shaped clamping base, into one leg of which the column is fitted, a groove in the under face of said clamping base and an opening in the lower end of said column registering with said groove, and an electric wire conduit lying in said groove and passing into the body of said mixer through the opening in the column thereof.

19. A drink mixer comprising a tubular column and a U-shaped clamping base, the upper leg of which is provided with an opening to receive the end of said tubular column, and means for leading electric wires into the body of said mixer comprising an aperture in the lower leg of said clamping base, a groove in the inner face of said clamping base, and an aperture in the lower end of said tubular column registering with the groove in the clamping base.

20. In a drink mixer, a tubular column, an electric switch mounted within the column, a movable member mounted to swing about the tubular column as a pivot, and means for actuating said switch through movement of the movable member.

21. In a drink mixer comprising an electric motor, an electric switch comprising a pair of substantially parallel spring switch elements provided with registering contact points, a supporting plate for said elements, means for insulating the switch elements from the supporting plate and from each other, an extension upon one of said switch elements, and means for applying pressure to said extension to separate the switch elements and break the current.

22. In a drink mixer comprising a movable container support and a tubular supporting column having an aperture in its wall, an electric motor mounted on said column, an electric switch supported within said tubular column through the medium of a supporting plate, a pair of spring switch elements carried by said supporting plate and having contact points, one of said switch elements having an extension, an actuating button mounted upon said extension and projecting through the aperture in the wall of said column, and means for actuating the switch upon a movement of said container support.

In testimony whereof I affix my signature.

STEPHEN J. POPLAWSKI.